Dec. 13, 1938.                    C. IASILLO                    2,140,014
                                BROOM CONNECTER
                              Filed Feb. 12, 1938
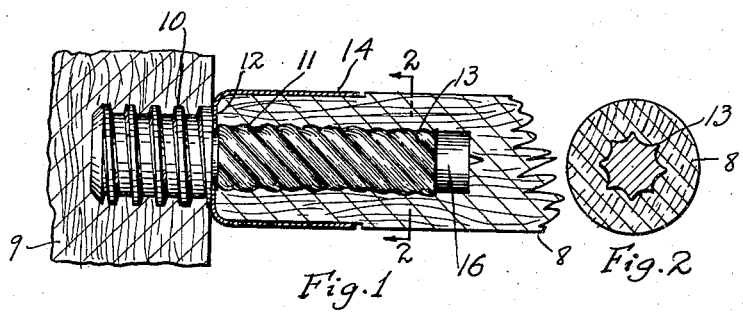
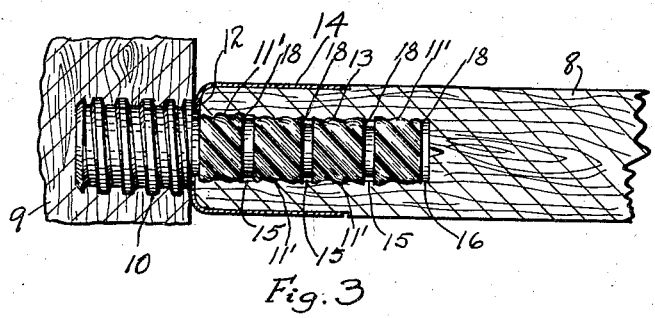
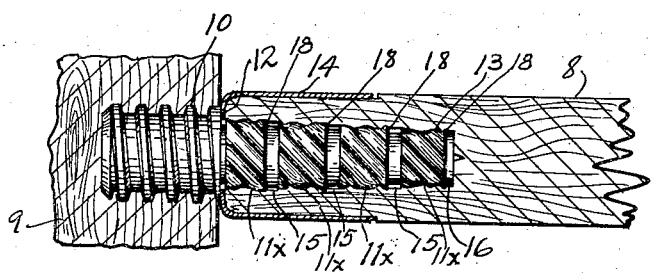
Casper Iasillo
INVENTOR
BY Martin Joachimson
ATTORNEY Patented Dec. 13, 1938

2,140,014

UNITED STATES PATENT OFFICE 2,140,014

BROOM CONNECTER

Casper Iasillo, Port Chester, N. Y., assignor to Joseph Gans, doing business under firm name Empire Brush Works, Port Chester, N. Y.

Application February 12, 1938, Serial No. 190,188

8 Claims. (Cl. 306—30)

This invention relates to improvements in brush handles and more particularly to a novel metallic connecter for attaching the handle to the brush.

It is common practice at present to connect brooms and particularly floor brooms to their handles by having a female socket of coarse, close threads formed in the wooden broom plate and a screw of like threads cut on the wood of the broom handle to cooperate with each other. This method of connection has the disadvantage that the wooden threads on the handle frequently break at the shoulder between handle and screw or wear out rather quickly, so that new handles have to be provided if it is possible to remove the threaded part of the handle from the broom plate or block. Another disadvantage consists in the fact that the wood of the handle as well as of the plate frequently expands so that it becomes difficult to remove one from the other.

It is an object of the present invention to abolish some and to remedy others of these defects.

It is another object to provide a metallic connecter which will not break at the end of the broom holding screw and which is adapted to be used with the ordinary handle and broom block.

It is a further object to provide such a connecter that is simple and inexpensive to manufacture.

Other objects and advantages will be apparent from the following detailed description of a preferred embodiment thereof, reference being had to the accompanying drawing in which—

Fig. 1 is a sectional side elevation of a broom and handle connecter embodying one form of the invention.

Fig. 2 is a section through the improved connecter on the plane of line 2—2 of Fig. 1.

Fig. 3 shows a connecter embodying a modified form of the invention in place of that shown in Fig. 1.

Fig. 4 shows another modified form of connecter joining a broom plate and handle which are shown in section.

The improved connecter is used for joining a broom handle 8 and a broom plate 9 such as shown in section in Figs. 1 to 4.

The form of improved connecter shown in Fig. 1 consists of a single cylindrical piece of steel, preferably stainless steel having two portions of different diameters extending from each end towards the center, the portion 10 being of larger diameter and extending approximately one-third of the length of the connecter, and the other portion 11 being of a smaller diameter and extending about two-thirds of the length so that a shoulder 12 is formed where the two portions connect. The portion 10 is provided with a coarse single thread to fit the ordinary standard socket in a broom plate such as 9, and the portion 11 is provided with multiple threads 13 having a very long pitch of about three times the diameter of the screw. The threads 13 have the form of sharp, pointed teeth as shown in Fig. 2 and by their pitch and shape are adapted to form a screw which will cut its own thread when driven or pressed into an aperture having the diameter of the screw at the bottom of its threads. This drive screw is driven into an axial aperture in the end face of a broom handle such as 8 up to shoulder 12 so that the coarse threaded portion of large diameter protrudes from the end of the handle. To prevent splitting of the handle when the screw is driven into it a ferrule cap 14 is driven over the outside of the handle end and held in place by shoulder 12. The chips cut by the screw threads are driven forward by the cutting edge at the front of the portion 11 into a cavity such as 16.

The coarse threaded portion 10 is screwed into the socket usually provided in the plate of every broom and in this a very effective and lasting connection between broom and handle is formed.

In Fig. 3 another form of improved connecter is illustrated which has the object to facilitate the driving of the screw 11' into handle 8. This is effected by cutting a plurality of spaced grooves 15 into the screw 11', the sides of which are perpendicular to the screw axis. The shoulders 18 of the grooves 15 each provide a cutting edge and space for cut chips in the grooves. The grooves 15 also permit a strong hold as the wood can swell or expand into them giving the screw additional hold in the handle.

The form shown in Fig. 4 is somewhat similar to that of Fig. 3 except that the screw portion 11x is tapered to increase the effect of the additional cutting edges on grooves 15. A small step is thereby formed at every groove and the cutting edges 18 protrude slightly over that part of the screw which already has passed into the axial aperture of handle 8 and thereby a better cutting effect is accomplished by each cutting edge of a groove.

It will be understood that changes in details may be made without departing from the principle of the invention and I therefore desire to be limited only by the state of the prior art and the appended claims.

I claim:

1. A broom connecter comprising a metallic bar having a cylindrical portion of large diameter extending from one end thereof with a coarse single thread formed thereon and another cylindrical portion of smaller diameter coaxially therewith extending from the opposite end of said bar beyond the middle thereof, having multiple threads of a pitch of more than double the pitch diameter formed thereon and a shoulder formed by the two threaded portions at their plane of junction.

2. A connecter of the kind described comprising a pair of metallic cylinders integral and in axial alinement with each other, one cylinder being of large diameter extending from one end of the device, a coarse single threaded screw formed on the outside of said cylinder, the other cylinder being of smaller diameter having a plurality of sharp threads formed thereon of a long pitch to form a drive screw extending over its full length and a shoulder formed by the two cylinders at their plane of junction, said drive screw being adapted to be driven into an axial aperture of a wooden handle bar and said coarse screw being adapted to fit a standard socket in a broom plate.

3. A broom connecter comprising a metallic cylindrical bar having a portion of large diameter extending from one end thereof with a coarse single thread formed thereon and a portion of smaller diameter extending from the opposite end of said bar beyond the middle thereof and having multiple threads of a pitch of more than double the pitch diameter formed thereon, the periphery of the outer end of said multiple threaded portion being provided with a sharp cutting edge for easily cutting threads into the wall of an aperture into which the screw may be driven.

4. A broom connecter comprising a metallic cylindrical bar having a portion of large diameter extending from one end thereof with a coarse single thread formed thereon and a portion of smaller diameter extending from the opposite end of said bar beyond the middle thereof, having multiple threads of a pitch of more than double the pitch diameter formed thereon and a plurality of spaced peripheral grooves in the multiple threaded portion having sharp corners to form cutting edges when the screw is driven into an aperture.

5. A connecter comprising a metallic cylindrical bar having a portion of large diameter extending from one end thereof with a coarse single thread formed thereon, a portion of smaller diameter extending from the opposite end of said bar beyond the middle thereof forming a shoulder at the junction with said coarse threaded portion, spaced peripheral grooves on said thinner portion forming a plurality of sections separated by said grooves, said sections being of different diameters increasing slightly from the free end of said portion at every groove and a continuing drive thread on every section having cutting edges formed by the protruding corners of every groove.

6. A connecter comprising a body member having an enlarged portion and a reduced portion, said enlarged portion having a coarse thread therearound and said reduced portion having a plurality of sharp threads formed thereon and having a number of spaced grooves formed therein, said reduced portion terminating in a sharp cutting edge.

7. A connecter comprising a metallic body member having an enlarged portion and a reduced portion, said enlarged portion having a coarse thread therearound, said reduced portion being stepped and tapered and having a plurality of sharp threads formed thereon and having a number of spaced grooves formed therein.

8. A broom connecter comprising a metallic bar having a cylindrical portion of large diameter and another cylindrical portion of smaller diameter integral and coaxial with said first named portion, a shoulder between said portions, said first named portion being provided throughout its length with a coarse external thread, said second portion being provided with multiple threads of a pitch of more than double the pitch diameter formed thereon and being provided with a cutting edge at its outer end.

CASPER IASILLO.